United States Patent [19]

Rawlyk et al.

[11] Patent Number: 5,289,556
[45] Date of Patent: Feb. 22, 1994

[54] OPTICAL FIBER UNITS AND OPTICAL CABLES

[75] Inventors: Michael G. Rawlyk; David W. Chiasson; Michael S. Fedoroff, all of Saskatoon, Canada

[73] Assignee: Northern Telecom Limited, Montreal, Canada

[21] Appl. No.: 949,927

[22] Filed: Sep. 24, 1992

[51] Int. Cl.⁵ .................................................. G02B 6/44
[52] U.S. Cl. ............................................................ 385/112
[58] Field of Search ................. 385/100, 112, 113, 114

[56] References Cited

U.S. PATENT DOCUMENTS

| | | | |
|---|---|---|---|
| 4,090,902 | 5/1978 | Ferrentino et al. | 385/114 |
| 4,138,193 | 2/1979 | Olszewski et al. | 385/114 |
| 4,151,031 | 4/1979 | Goad et al. | 156/324 |
| 4,521,767 | 6/1985 | Bridge | 385/102 |
| 4,784,461 | 11/1988 | Abe et al. | 385/112 |
| 4,909,591 | 3/1990 | Capol | 385/100 |

FOREIGN PATENT DOCUMENTS 0100609  4/1991  Japan ...................... 385/100

*Primary Examiner*—Akm E. Ullah
*Attorney, Agent, or Firm*—R. J. Austin

[57] ABSTRACT

Optical fiber unit with optical fibers loosely contained within a flexible tube formed from two plastic strips which are bonded together along edge seams. The structure is completely flexible and the tube is compressible and deformable to assist in packing into channels in a cable while maximizing fiber density in the cable product.

13 Claims, 1 Drawing Sheet

OPTICAL FIBER UNITS AND OPTICAL CABLES

This invention relates to optical fiber units and optical cables.

In the optical cable industry, optical fibers are retained in cables in various ways. In some cable structures there is provided a central core provided with a plurality of circumferentially spaced ribs which extend along the core and project outwardly from it. Grooves defined between the ribs house one or more fibers. An example of this type of optical cable structure is described in U.S. Pat. No. 4,361,381 granted Nov. 30, 1982, and entitled "Optical Cable" in the name of R. J. Williams. In the cable structure defined in the above patent, a plurality of optical fibers are housed within the grooves, the fibers have freedom for lateral movement from side-to-side of the grooves. This lateral movement enables the fibers to move independently of the central core during flexing of the cable so as to reduce any tendency for increase in signal attenuation. A problem with this type of structure is that during laying of the fibers into the grooves, the fibers are completely unprotected and may prove difficult to handle. A later U.S. Pat. No. 4,784,461 granted Nov. 15, 1988, and entitled "Optical Cable" in the name of K. Abe, has a similar structure to that described above but the optical fibers in each groove are located within a tube which is itself housed within and extends along the groove. With this structure, the fibers and the tube are formed initially into a subassembly and then the tube containing the fibers is passed into the groove. In this arrangement it is easier to assemble the fibers into the grooves than in the structure described in the earlier patent and there are other distinct advantages such as discussed in U.S. Pat. No. 4,784,461. One problem with the structure as described in the latter patent however is that with the use of a tube in the grooves to hold the fibers, the tube itself occupies a high percentage of the space of the groove and this is limiting on the number of optical fibers which may be located in each groove.

In other cable constructions, optical fibers have been arranged in laterally spaced positions relative to one another as parts of flat cables. In these flat cable structures, optical fibers are normally fixed in position between layers of material so that they have no lateral freedom of movement. One such flat cable construction is that described in U.S. Pat. No. 4,090,902 granted May 23, 1978, in the name of Ferrentino and entitled "Optical Fiber Cable And Manufacture Thereof". In the structure described in that patent, the optical fibers are disposed laterally spaced between two thermoplastic films which are sealed together so as to embed the fibers in between them. While flexibility of this structure may result, because of the spacing of the fibers, the density of the fibers is not particularly satisfactory in the structure and also the fibers are not free to move relative to each other during flexing so that attenuation in some fibers may result from localized bending and flexing stresses. Other flat cables having the same type of disadvantage are described in other patents such as U.S. Pat. No. 4,138,193.

The present invention seeks to provide an optical fiber unit in which a plurality of fibers are used and which has extreme flexibility and which may be easily incorporated into a cable construction.

Accordingly, the present invention provides an optical fiber unit comprising a plurality of optical fibers loosely contained within a flexible tubular member to allow for lateral movement of the fibers, the flexible tubular member formed from plastic strip means extending around the fibers to provide space for lateral movement of the fibers, the plastic strip means having at least one longitudinally extending seam provided by longitudinally extending edge regions of the strip means which are bonded together to provide the tubular member.

The above unit is simply made from plastic strip means which, when formed into the tubular member allows space for lateral movement of the fibers. Hence, a structure is provided in which the fibers are not bonded in position to the tubular member. As a result and as fibers and tubular member may therefore be individually flexible, the optical fiber unit has optimal flexibility.

Conveniently the plastic strip means comprises two opposing plastic strips bonded together at longitudinally extending edge regions to provide two longitudinally extending seams. Preferably, in cross-section the tubular member has a major axis and a minor axis normal to the major axis. The unit then tends towards a flat structure and if each fiber is freely movable laterally of other fibers, this minimizes stresses on the fibers which could result in increase in signal attenuation. The structure is easily flexed and may be flexed in multiple planes so as to be easily handled for incorporation into cable structures. In a practical sense the optical fiber unit may have an inside dimension along the major axis of approximately 3 millimeters and an inside dimension along the minor axis of 1.1 millimeters. This may be provided with a thickness of plastic material of 5 mil and preferably of a thickness of around 2 mil. Because of the shape and flexibility of the tubular member, it is easily flexed as previously mentioned and is also compressible inwardly so as to reduce its volume whereby the flat structure may be incorporated into passageways of small cross-sectional area within a cable. In addition, a plurality of the optical fiber units according to the invention may be disposed side by side within a passage of a cable and, as the walls of the flexible tubular members may be particularly thin, i.e., 5 mil or less in material thickness, and are also compressible to reduce the interior space, then the number of optical fibers in any particular passage of a cable may be maximized.

The invention also includes an optical cable providing at least one longitudinally extending passage along which extends at least one optical fiber unit as defined according to the invention above.

In the optical cable construction according to the invention, the longitudinally extending passage may be a coaxial passage around which is disposed a metal sheath and a surrounding jacket. Alternatively, an optical cable according to the invention comprises a longitudinally extending crush resistant core formed with a plurality of circumferentially spaced outwardly facing ribs, and there is a material layer surrounding the core to form with the ribs a plurality of passages extending longitudinally of the cable, optical fiber units being disposed within some at least of these passages.

Embodiments of the invention will now be described, by way of example, with reference to the accompanying drawings, in which.

Figure 1:
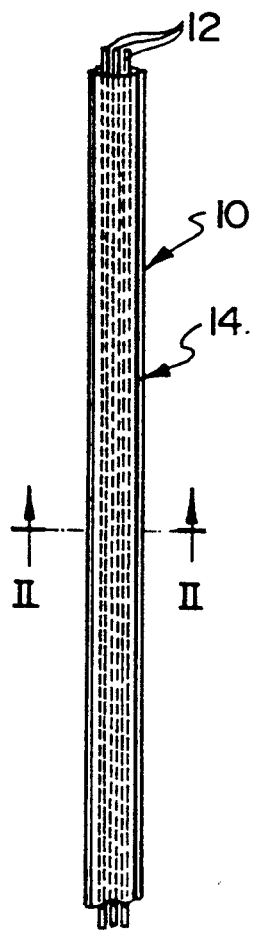
FIG. 1 is a plan view of part of an optical fiber unit according to a first embodiment of the invention.
Figure 2:
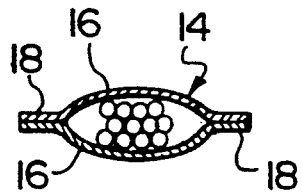
FIG. 2 is a cross-sectional view through the optical fiber unit taken along Line II—II in FIG. 1.

In a first embodiment as shown in FIGS. 1 and 2, an optical fiber unit 10 comprises a plurality of optical fibers 12 loosely contained within a flexible elongate tubular member 14. The tubular member 14 is formed from two opposing plastic strips 16 of polyethylene (other suitable plastics material may be used). The two strips are bonded together at two longitudinally bonded seams 18 provided by longitudinally extending side regions of the strips. The bonding may be provided by a suitable adhesive with the side regions passed between heated rollers to cause formation of the seams. Alternatively, the side regions may be fused together by passage between rollers which are heated to cause softening of the plastics material. However, ultrasonic welding may be used. As may be seen from FIG. 2, the tubular member 14 is wider along a major axis containing the bonded together edge regions than in a minor axis normal to the major axis. The inside width dimension between the seams, i.e., along the major axis, is approximately 3 millimeters whereas along the minor axis there is an inside width of approximately 1.1 millimeters for the passage. The strips 16 preferably should be as thin as possible consistent with the strength requirements and a thickness of 5 mil is suitable, but preferably 2 mil may be used.

As may be seen from the above optical fiber unit structure, it is easily manufactured and provides a flexible elongate tubular member for containing a plurality of fibers in a group without the need for extruding a tube. In addition, the strips 16 forming the tubular member are particularly flexible so as to result in an extremely flexible tubular member which is easily guided into a passage of a cable during optical cable manufacture. Further the tubular member may be easily flexed in multiple planes to suit any particular requirement. The member may be flexed therefore about its axis, it may be torsionally twisted about the axis, or it may be flexed in the plane in the cross-section as shown in FIG. 2 so that the edge regions tend to move relative to each other around the fibers. In addition to this, the material of the tubular member is easily compressed and one strip 16 may be urged towards the other strip by an outside force so as to decrease the size of the passage containing the fibers and thereby decrease the overall cross-sectional area of the unit.

As a result of all these properties of the unit, it may be accommodated in any passage of suitable cross-sectional area while the cross-sectional shape of the passage does not necessarily place any restrictions upon the location of the unit in the passage. It follows that a plurality of the optical fiber units may be disposed together within an optical cable passage and the tubular members 14 of each of the units may be caused to collapse. In this case the units may lie close together and it is possible to place a maximum number of fibers within a passage of unit size.

Figure 3:
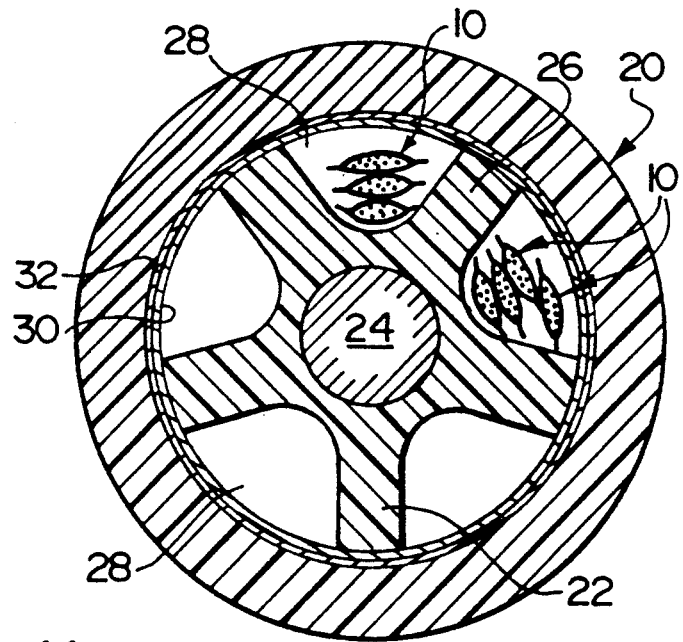
FIG. 3 is a cross-sectional view through an optical cable according to a second embodiment and incorporating optical fiber units of the first embodiment.
Figure 4:
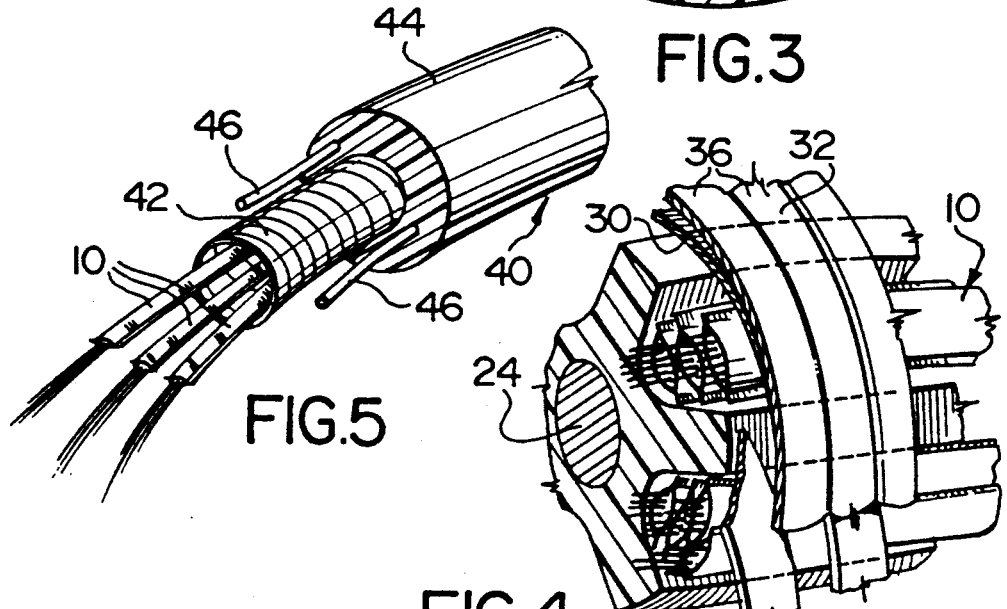
FIG. 4 is a sectioned isometric view of part of the cable of the second embodiment.

In a second embodiment, as illustrated in FIGS. 3 and 4, an optical cable 20 comprises a crush resistant core 22 surrounding a steel strength member 24, the core being formed from extruded plastics material such as high density polyethylene. The core is extruded with a plurality, i.e., five, circumferentially spaced ribs 26 which extend longitudinally of the core. The ribs lie at angles to the core axis and for this purpose may extend in helical fashion longitudinally of the core. However, in a preferred arrangement, the ribs extend in sinusoidal fashion around the axis. Thus the ribs, as they follow the sinusoidal paths, extend longitudinally of the core firstly in one direction and then in the other around the core.

The ribs define between them longitudinally extending grooves 28 which of course are also sinusoidal.

Immediately surrounding the core 22 is a conventional binding tape 30. Surrounding the core and binding tape is a metal sheath 32 which is formed with corrugations 36 (FIG. 4) which extend circumferentially around the core and are spaced apart longitudinally of the cable. The grooves 28 which face outwardly from the core 22 are closed by the sheath 32 so as to form the grooves into passages. Within each of the grooves is provided a plurality of optical fiber units 10 as described in the first embodiment. In each groove 28, the optical fiber units 10 are held together by a binding tape (not shown) which is used to hold these units in the form of a subassembly which is located within the grooves thereby avoiding the separate location of the optical fiber units therein. As may be seen from FIG. 3, in each of the grooves 28 the required number of optical fiber units are easily located in place and if necessary volumetric space within each of the units is decreased, i.e., within the tubular members 14, by causing the tubular members to collapse somewhat as the binding tape 30 and the sheath 32 are wrapped around the core 22. It has been found that, with each of the optical fiber units housing perhaps twelve fibers, at least three and possibly four of the units may be positioned into a groove 28 so that at least 36 fibers are disposed within each groove. This is far in excess of the numbers of fibers which may have been previously included in each of the grooves of a core member of the same design and size, whether or not these fibers were disposed loosely within the passage or within a tube as disclosed in prior Pat. No. 4,784,461 referred to above. As may be seen from FIG. 3, the tubular members may be collapsed and flexed into any shape which suits the passage into which they are placed. Further, the tubular members may slide relative to each other within their bindings so as to more easily accommodate the space within a groove, dependent on the number of packages which are being placed therein. For instance, in FIG. 4, as shown in one of the grooves containing four of the tubular members, there has been lateral displacement of the units out of a stack so as to usefully accommodate the space within the groove.

The optical fiber units 10, apart from being useable to provide greater numbers of optical fibers in a passage of unit size in a cable, are extremely flexible and are collapsible to decrease the inside volume of a package while still permitting lateral movement of the optical fibers. The cross-sectional shape of each optical fiber unit, i.e., having major and minor axial dimensions as described above, allows for greater flexibility in the one direction than in the other and is also more readily collapsible in the plane of the minor axis so that when stacked with other units as shown in the cable of the second embodiment, it readily adapts itself to the space requirements within the passage. In the second embodiment, it is convenient for the optical fiber units 10 in each of the grooves 28 to be surrounded by a water blocking material which fills the remainder of the groove. This water blocking material may be a jelly or grease type material or a water swellable material, i.e., which swells upon contact with water, or a filamentary material, e.g., string which carries particles of a water swellable material. In addition, a string carrying particles of water swellable material may be included within the tubular member of each optical fiber unit 10.

Figure 5:
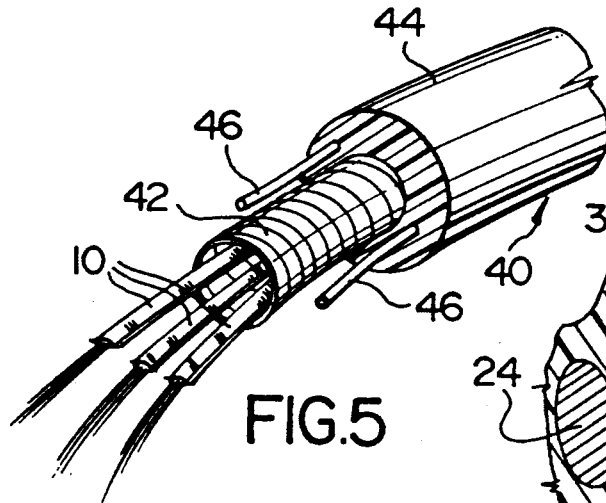
FIG. 5 is an isometric sectioned view of part of a cable according to a third embodiment.

In the third embodiment as shown in FIG. 5, an optical cable 40 has a corrugated steel sheath 42 surrounding a central passage which contains a plurality of the optical fiber units 10 retained within a water swellable material which fills the remainder of the passage. Surrounding the corrugated steel sheath 42 is a plastics jacket 44 of any suitable material, e.g., polyethylene, and the cable is reinforced by longitudinally extending tensile members, such as the two steel members 46 disposed within the jacket material and lying diametrically opposed to one another.

What is claimed is:

1. An optical fiber unit comprising a plurality of optical fibers loosely contained within a flexible elongated tubular member to allow for lateral movement of the fibers, the flexible tubular member being inwardly collapsible and formed from plastic strip means extending around the fibers to provide space for lateral movement of the fibers, the plastic strip means having at least one longitudinally extending seam provided by longitudinally extending edge regions of the strip means which are bonded together to provide the tubular member.

2. A unit according to claim 1 wherein the plastic strip means comprises two opposing plastic strips bonded together at longitudinally extending edge regions to provide two longitudinally extending seams.

3. A unit according to either claim 1 or claim 2 wherein the tubular member in cross-section has a major axis and a minor axis normal to the major axis.

4. An optical fiber unit according to claim 3 wherein along the major axis, the tubular member has an inside dimension between 2.8 and 3.2 millimeters and along the minor axis it has an inside dimension between 0.9 and 1.3 millimeters, the plastic strips each having a maximum thickness of 5 mil.

5. A unit according to claim 4 wherein the thickness of each plastic strip is approximately 2 mil.

6. An optical cable comprising a longitudinally crush resistant means defining at least one longitudinally extending passage and a plurality of optical fiber units extending side-by-side along the passage, each optical fiber unit comprising a plurality of optical fibers loosely contained within a flexible elongated tubular member to allow for lateral movement of the fibers, the flexible tubular member being inwardly collapsible and formed from plastic strip means extending around the fibers to provide space for lateral movement of the fibers, the plastic strip means having at least one longitudinally extending seam provided by longitudinally extending edge regions of the strip means which are bonded together to provide the tubular member, and the flexible tubular members of the units are urged against one another to cause at least partial inwards collapse of the tubular members.

7. An optical cable according to claim 6 wherein the crush resistant means comprises a longitudinally extending crush resistant core formed with a plurality of circumferentially spaced outwardly facing ribs, a material layer surrounding the core to define with the ribs a plurality of passages, and a plurality of optical fiber units are disposed in at least one of the passages.

8. A cable according to claim 7 wherein at least some passages contain a plurality of optical fiber units.

9. A cable according to claim 8 wherein each plurality of optical fiber units is held together by a binder extending around the units.

10. An optical cable according to claim 6 wherein the passage has a longitudinal axis coincident with the longitudinal axis of the cable.

11. An optical cable according to claim 10 wherein the crush resistant means comprises a radially inner metal sheath which surrounds and defines the passage, and a jacket surrounds the metal sheath.

12. A method of making an optical cable comprising:
providing a plurality of optical fiber units, each optical fiber unit comprising a plurality of optical fibers loosely contained within a flexible elongated tubular member to allow for lateral movement of the fibers, the flexible tubular member being inwardly collapsible and formed from plastic strip means extending around the fibers to provide space for lateral movement of the fibers, the plastic strip means having at least one longitudinally extending seam provided by longitudinally extending edge regions of the strip means which are bonded together to provide the tubular member;
and disposing the plurality of optical fiber units within a longitudinally extending passage defined within a longitudinally extending crush resistant means of the cable, with the units urged against one another to cause at least partial inwards collapse of the tubular members.

13. A method according to claim 12 comprising assembling the optical fiber units together and holding them together with a binder extending around the units, and then disposing the assembly of units within the passage.

* * * * *